US009178887B2

(12) United States Patent
Dutta et al.

(10) Patent No.: US 9,178,887 B2
(45) Date of Patent: Nov. 3, 2015

(54) STRATEGIES FOR CONTROLLING USE OF A RESOURCE THAT IS SHARED BETWEEN TRUSTED AND UNTRUSTED ENVIRONMENTS

(71) Applicant: Microsoft Corporation, Redmond, WA (US)

(72) Inventors: Sunava Dutta, Seattle, WA (US); Zhenbin Xu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 365 days.

(21) Appl. No.: 13/887,953

(22) Filed: May 6, 2013

(65) Prior Publication Data

US 2013/0247227 A1   Sep. 19, 2013

Related U.S. Application Data

(63) Continuation of application No. 11/733,317, filed on Apr. 10, 2007, now Pat. No. 8,438,653.

(51) Int. Cl.
*H04L 29/06* (2006.01)
*G06F 21/55* (2013.01)
*G06F 21/62* (2013.01)

(52) U.S. Cl.
CPC .............. *H04L 63/10* (2013.01); *G06F 21/554* (2013.01); *G06F 21/6209* (2013.01); *H04L 63/168* (2013.01); *H04L 63/20* (2013.01); *G06F 2221/2147* (2013.01)

(58) Field of Classification Search
CPC ................................ H04L 63/20; H04L 63/10
See application file for complete search history.

(56) References Cited

U.S. PATENT DOCUMENTS

| | | | |
|---|---|---|---|
| 5,392,386 A | 2/1995 | Chalas | |
| 6,269,389 B1 * | 7/2001 | Ashe | 718/100 |
| 6,321,256 B1 | 11/2001 | Himmel et al. | |
| 6,345,318 B1 | 2/2002 | Gamon | |
| 6,725,380 B1 | 4/2004 | Forlenza et al. | |
| 6,874,084 B1 | 3/2005 | Dobner et al. | |
| 6,950,980 B1 | 9/2005 | Malcolm | |

(Continued)

OTHER PUBLICATIONS

"Final Office Action", U.S. Appl. No. 11/733,317, (Oct. 19, 2010), 16 pages.

(Continued)

*Primary Examiner* — Chau Le
(74) *Attorney, Agent, or Firm* — Henry Gabryjelski; Kate Drakos; Micky Minhas

(57) ABSTRACT

A strategy is described for controlling access to a resource which is shared between a trusted environment and an untrusted environment. The resource can represent a clipboard module. The trusted environment can include trusted client functionality, while the untrusted environment can include potentially untrusted network-accessible entities (e.g., websites) which seek to access the clipboard module. The strategy provides a security presentation which notifies a user when a network-accessible entity is attempting to access the clipboard module, identifying the entity which is making the attempt, together with the nature of the information being read or added to the clipboard module. The security presentation invites the user to approve or deny the particular attempt (or all such attempts from the network-accessible entity), and/or clear the clipboard module. The security presentation does not block the user's interaction with other parts of a user interface presentation.

20 Claims, 7 Drawing Sheets

(56) References Cited

U.S. PATENT DOCUMENTS

| | | | |
|---|---|---|---|
| 6,951,295 | B1 | 10/2005 | Gaus et al. |
| 6,983,328 | B2 | 1/2006 | Beged-Dov et al. |
| 6,986,105 | B2 | 1/2006 | Walker, Jr. |
| 7,146,571 | B2 | 12/2006 | Bates et al. |
| 7,260,636 | B2 | 8/2007 | Blumenau et al. |
| 7,389,511 | B1 | 6/2008 | Maynard |
| 7,483,896 | B2 | 1/2009 | Johnson |
| 7,484,245 | B1 | 1/2009 | Friedman et al. |
| 7,509,397 | B1 | 3/2009 | Totty et al. |
| 8,429,551 | B2* | 4/2013 | Kim et al. ............. 715/770 |
| 8,438,653 | B2 | 5/2013 | Dutta et al. |
| 2001/0042045 | A1* | 11/2001 | Howard et al. .......... 705/51 |
| 2002/0124172 | A1 | 9/2002 | Manahan |
| 2002/0138653 | A1* | 9/2002 | Ogura ................. 709/246 |
| 2002/0174241 | A1* | 11/2002 | Beged-Dov et al. ..... 709/230 |
| 2002/0181448 | A1 | 12/2002 | Uskela et al. |
| 2002/0184491 | A1 | 12/2002 | Morgan et al. |
| 2003/0028762 | A1 | 2/2003 | Trilli et al. |
| 2003/0037253 | A1* | 2/2003 | Blank et al. ........... 713/200 |
| 2004/0010701 | A1 | 1/2004 | Umebayashi et al. |
| 2004/0034794 | A1 | 2/2004 | Mayer et al. |
| 2004/0100496 | A1 | 5/2004 | Creasor et al. |
| 2004/0193597 | A1 | 9/2004 | Johnson |
| 2004/0226012 | A1 | 11/2004 | Awada et al. |
| 2004/0260793 | A1 | 12/2004 | Ichikawa et al. |
| 2005/0182928 | A1 | 8/2005 | Kamalanathan et al. |
| 2005/0268100 | A1 | 12/2005 | Gasparini et al. |
| 2006/0053293 | A1 | 3/2006 | Zager et al. |
| 2006/0218403 | A1 | 9/2006 | Sauve et al. |
| 2006/0225137 | A1 | 10/2006 | Odins-Lucas et al. |
| 2006/0230356 | A1* | 10/2006 | Sauve et al. .......... 715/777 |
| 2006/0271861 | A1* | 11/2006 | Yolleck et al. ......... 715/760 |
| 2006/0277341 | A1* | 12/2006 | Johnson ............... 710/200 |
| 2007/0011749 | A1 | 1/2007 | Allison et al. |
| 2007/0055478 | A1 | 3/2007 | Perazzolo |
| 2007/0107057 | A1* | 5/2007 | Chander et al. ........ 726/22 |
| 2007/0277120 | A1 | 11/2007 | Wilson et al. |
| 2008/0022043 | A1 | 1/2008 | Adams et al. |
| 2008/0028442 | A1* | 1/2008 | Kaza et al. .......... 726/4 |
| 2008/0256601 | A1 | 10/2008 | Dutta |

OTHER PUBLICATIONS

"Final Office Action", U.S. Appl. No. 11/733,317, (Mar. 21, 2011), 18 pages.

"Non Final Office Action", U.S. Appl. No. 11/733,317, (Dec. 30, 2010), 17 pages.

"Non-Final Office Action", U.S. Appl. No. 11/733,317, (Jul. 18, 2012), 19 pages.

"Non-Final Office Action", U.S. Appl. No. 11/733,317, (Jul. 21, 2010), 15 pages.

"Notice of Allowance", U.S. Appl. No. 11/733,317, (Jan. 10, 2013), 7 pages.

"Protecting Commercial Secure Web Servers from Key-Finding Threats", *nCipher, Inc.*, Available at <www.ncipher.com/uploads/resources/pcws.pdf>,(1999),12 pages.

Adler, Andy et al., "TellTable: A Server for Collaborative Office Applications", *Proceedings of CSCW 2004*, Chicago, Nov. 6-10, 2004, 6 pages.

Fenstermacher, Kurt D., et al., "A Lightweight Framework for Cross-Application User Monitoring", *Computer, IEEE*, (Mar. 2002), pp. 51-59.

Herzberg, Amir et al., "Protecting (even) Naive Web Users, or: Preventing Spoofing and Establishing Credentials of Web Sites", *Bar Ilan University*, Available at <www.cs.bu.ac.il/~herzea/papers/ecommerce/trusted credentials area.pdf>,(Jul. 18, 2004), 26 pages.

Ross, Blake et al., "Stronger Password Authentication Using Browser Extensions", *Usenix—Security '05 Paper, 14th USENIX Security Symposium Technical Paper*, (Aug. 3, 2005), 15 pages.

Verisign Inc., "Licensing VeriSign Certificates: Securing Multiple Web Server and Domain Configurations", *White Paper*, Available at <www.msctrustgate.com/pdf/licensing.pdf>,(Nov. 2, 2001), 15 pages.

* cited by examiner

STRATEGIES FOR CONTROLLING USE OF A RESOURCE THAT IS SHARED BETWEEN TRUSTED AND UNTRUSTED ENVIRONMENTS

PRIORITY

This application is a continuation of and claims priority under 35 U.S.C. §120 to U.S. patent application Ser. No. 11/733,317, filed Apr. 10, 2007, and titled "Strategies for Controlling Use of a Resource that is Shared Between Trusted and Untrusted Environments," the disclosure of which is incorporated by reference herein in its entirety.

BACKGROUND

A clipboard facilitates the transfer of information between applications. For example, in one traditional scenario, a user can copy information from a first application to the clipboard, open up a second application, and then paste the contents of the clipboard into the second application.

At least one browser provides a clipboard for use in a wide area network environment, such as the Internet. This allows, for example, a user to copy information from an application to the clipboard, open a web page using the browser, and then paste the contents of the clipboard into an input field of the web page. A website may also independently read information from the clipboard or write information to the clipboard, or perform some other action that affects the clipboard.

Most websites use the clipboard for legitimate purposes. However, there is also a risk that a website may intentionally or unintentionally access the clipboard for purposes which are contrary to the interests of the end user. Consider two examples. In a first case, the user may have copied sensitive information into the clipboard. For example, the user may have copied a bank account number into the clipboard so that she may later paste this information into an input field of a banking-related website. However, in one scenario, the user may inadvertently be directed to a website that is masquerading as the legitimate banking-related website. That malicious website can extract the sensitive information from the clipboard and potentially use that information to access the user's banking account.

In a second case, a malicious website may add information to the clipboard that includes potentially harmful content. For example, the website may add information to the clipboard that includes code-bearing content or other executable or interpretable information. If the user pastes the code-bearing content into an application, the content can potentially cause the application to fail. The code-bearing content can also potentially cause more pervasive damage to the user's system.

In general, an Internet-accessible clipboard is a resource that is shared between a trusted environment and a potentially untrusted environment. The trusted environment may include one or more trusted applications, such as one or more applications that run locally on the user's client device. The untrusted environment may include one or more potentially untrusted websites or other network-accessible entities.

Phrased in these terms, it would be desirable to effectively control access to a clipboard (or other type of resource) that is shared between a trusted environment and an untrusted environment.

SUMMARY

A strategy is described for controlling access to a resource which is shared between a trusted environment and an untrusted environment. The resource can represent a memory module, such as a clipboard module, that can be accessed by various entities. The trusted environment can include trusted client functionality, while the untrusted environment can include potentially untrusted network-accessible entities (e.g., web pages). The network-accessible entities may seek to read information from the clipboard module or write information to the clipboard module or perform some other action which affects the clipboard module. Some of the network-accessible entities may seek access to the clipboard module for purposes that are undesirable from the standpoint of the end user.

The strategy provides a security presentation which helps the user decide whether a network-accessible entity should be allowed to access the clipboard module. The security presentation notifies a user when a network-accessible entity is attempting to access the clipboard module, identifying the entity which is making the attempt, together with the nature of the information being read or added to the clipboard module. The security presentation invites the user to approve or deny the current attempt (or approve or deny all such attempts from the network-accessible entity), and/or clear the clipboard module. The security presentation does not block the user's interaction with other parts of a user interface presentation.

Additional exemplary implementations and features are described in the following.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for controlling access to a resource that is shared between a trusted environment and an untrusted environment. The strategy can be manifested in various systems, apparatuses, modules, procedures, storage mediums, data structures, and other forms.

This disclosure includes the following sections. Section A describes an exemplary system for controlling access to a resource, such as a clipboard module. Section B describes an exemplary procedure that explains the operation of the system of Section A.

A. Exemplary System

As a preliminary note, any of the functions described with reference to the figures can be implemented using software, firmware, hardware (e.g., fixed logic circuitry), manual processing, or a combination of these implementations. The term "logic," "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

A.1. Overview of System (FIG. 1)

Figure 1:
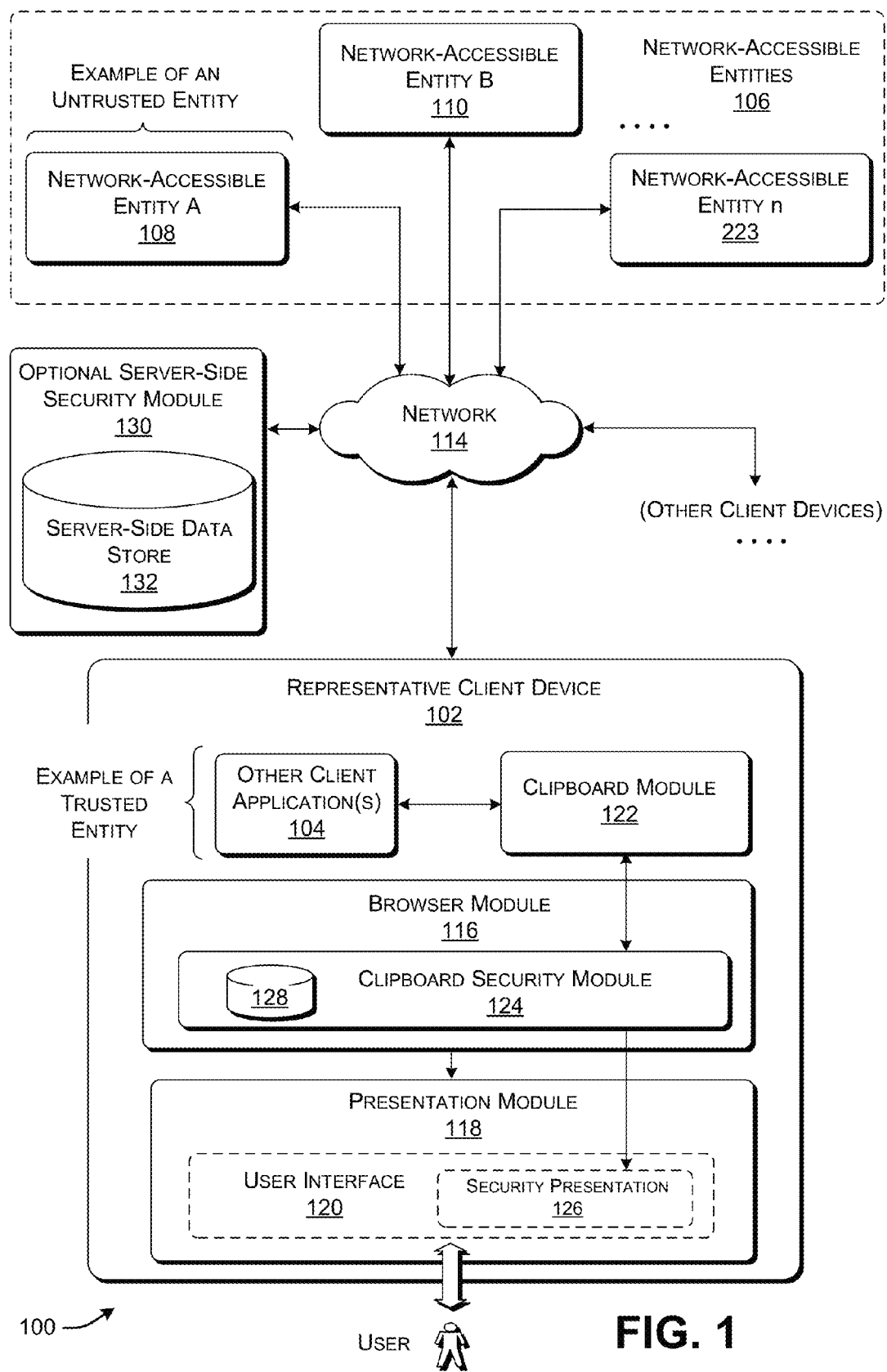
FIG. 1 shows an exemplary system for controlling access to a clipboard module by providing a security presentation.

FIG. 1 shows one exemplary system 100 for controlling access to a shared resource. The resource may be shared between a trusted environment and an untrusted environment. The trusted environment may include functionality associated with a representative user device 102, such as one or more client applications 104. The untrusted environment may include a plurality of network-accessible entities 106, including representative network-accessible entity A 108, network-accessible entity B 110, and network-accessible entity n 112. Generally stated, the trusted environment is trusted in the sense that an end user has reasonable assurance the agents within the environment will operate in conformance with the interests of the end user. The untrusted environment is untrusted in the sense that the end user has no reasonable assurance that agents will operate in conformance with the interests of the end user.

In accordance with one implementation of the system 100, the user device 102 can comprise any processing device that can be operated by the user. For example, the user device 102 can represent a personal computer, a lap-top computer, a personal digital assistant (PDA), a mobile telephone, a game console, a set-top box, and so forth. The network-accessible entities 106 can comprise various websites associated with respective network addresses. Each network-accessible entity 106 can represent one or more server-type computers, data stores, and/or other processing equipment. A network 114 can couple the user device 102 to the network-accessible entities 106. The network 114 can represent a wide area network (WAN) (such as the Internet), a local area network (LAN) (such as an intranet), or some combination of WAN(s) and LAN(s). The network 114 can include any combination of hardwired and/or wireless links, routers, gateways, name servers, etc., governed by any protocol or combination of protocols.

The representative user device 102 can interact with the network-accessible entities 106 using a browser module 116. The browser module 116 represents functionality (e.g., software and/or hardware) for allowing users to access the network-accessible entities 106, receive content provided by these network-accessible entities 106, and then interact with this received content. More specifically, the browser module 116 allows users to access various websites, display various web pages provided by these websites, and then interact with these web pages.

The browser module 116 can present information to the user via a presentation module 118. The presentation module 118 represents any type of display device, audio output device, etc., and/or any combination of such devices. The presentation module 118 presents its output in the form of a user interface presentation 120, such as a graphical user interface presentation (GUI).

The shared resource can represent any functionality that is shared between the trusted environment and the untrusted environment. For example, the shared resource can represent a memory module that can be accessed by both the trusted environment and the untrusted environment, such as a clipboard module 122. Users may copy information to the clipboard module 122 and read information from the clipboard module 122. For example, the user can add information to the clipboard module 122 from one application, open a second application, and then paste the information from the clipboard module 122 into the second application. In the context of FIG. 1, any agent in the trusted environment and any agent in the untrusted environment can read from and/or write to the clipboard module 122. For example, one of the local client applications 104 can access the clipboard module 122. Further, one or more of the network-accessible entities 106 can access the clipboard module 122.

The following explanation will describe security provisions for controlling access to the clipboard module 122. However, it should be noted that the principles described herein are applicable to other types of shared resources. Moreover, FIG. 1 illustrates the clipboard module 122 as being locally implemented by the user device 102. But in another case, a remote entity (such as a server-type computer) can be used to implement the clipboard module 122. In still another implementation, the clipboard module 122 can be implemented by a combination of local and remote functionality.

The browser module 116 includes a clipboard security module 124. The purpose of the clipboard security module 124 is to control access to the clipboard module 122 by one of the network-accessible entities 106. That is, the clipboard security module 124 controls whether a network-accessible entity (e.g., a website) is allowed to read information from the clipboard module 122 and/or write information to the clipboard module 122 and/or perform any other action that affects the clipboard module 122.

The clipboard security module 124 performs the above-described role by providing a security presentation 126 on the user interface presentation 120. Assume, for instance, that the browser module 116 is interacting with a web page provided by one of the network-accessible entities 106. This web page, as presented to the user, constitutes an instance of "main content," according to the terminology used herein. The browser module 116 can present the main content in a first user interface presentation. The clipboard security module 124 can present the security presentation 126 in a second user interface presentation. In one exemplary implementation, the second user interface presentation can comprise a panel or other kind of display section that is displayed adjacent to the first user interface presentation, e.g., as a "sidebar" with respect to the first user interface presentation.

In one implementation, the clipboard security module 124 presents the security presentation 126 when it detects that a network-accessible entity is attempting to access the clipboard module 122, e.g., to read information from the clipboard module 122 or write information to the clipboard module 122 or perform any other action that affects the clipboard module 122. The clipboard security module 124 can remove the security presentation 126 after the threat posed by the access attempt has been resolved (in any one of the ways to be described below).

The clipboard security module 124 presents various fields of information via the security presentation 126. By way of overview, the clipboard security module 124 can convey, without limitation, one or more of the following fields of information. Later sections provide a more detailed explanation of the information that can be conveyed by the security presentation 126.

Access Notification Field. The clipboard presentation module 124 can display a message which alerts the user that there has been an attempt to access the clipboard module 122. This message can identify the network-accessible entity which is making the attempt as well as what action the entity is attempting to perform.

Warning Message Field. The clipboard presentation module 124 can optionally display a warning message to the user which characterizes the type of the threat posed by the access attempt.

Clipboard Contents Field. The clipboard presentation module 124 can provide a message which conveys the nature of the information that the network-accessible entity is attempting to read from the clipboard module 122 or write to the clipboard module 122.

Action Invitation Field. The clipboard presentation module 124 can display various command prompts which invite the user to take action with respect to the attempted access. One such command prompt invites the user to approve the current access attempt. Another command prompt invites the user to deny the current access attempt. Another command prompt invites the user to approve all access attempts by the particular network-accessible entity that is making the current access attempt, including the current attempt and all future attempts. Another command prompt invites the user to deny all access attempts by the particular network-accessible entity, including the current attempt and all future attempts. Another command prompt invites the user to clear the information stored in the clipboard module 122 or only selected parts of the information. Still further command prompts can be provided to the user. The user can select any one or more of these command prompts to take action with respect to the attempted access.

In another case, one or more aspects of the security presentation 126 can be conveyed to the user in audible form or some other form, rather than, or in addition to, visual form.

The clipboard security module 124 can provide the security presentation 126 in such a manner that this presentation is non-blocking with respect to the main content being provided in the first user interface presentation. This means that the browser module 116 allows the user to continue interacting with the main content while the clipboard security module 124 is waiting for the user to make a decision with respect to the attempted access (e.g., whether to approve or deny the attempt), if, in fact, a particular access attempt requires the user to make a decision. This is in contrast with a type of display that freezes interaction with the main content until the user makes a decision regarding how to proceed.

In one implementation, the clipboard security module 124 represents functionality that is implemented by the user device 102. In performing its role, the local clipboard security module 124 can make access to one or more stores, represented by local store 128. For example, the local store 128 can maintain a list of network-accessible entities that the user has generally permitted to access the clipboard module 122 (e.g., by activating an "Approve Always" command prompt for these entities), and/or a list of network-accessible entities that the user has generally prohibited from accessing the clipboard module 122 (e.g., by activating a "Deny Always" command prompt for these entities).

In another implementation, remote network-accessible security functionality can alternatively, and/or in addition, help control access to the clipboard module 122. Optional server-side security module 130 can implement such network-accessible security functionality. The server-side security module 130 includes one or more data stores, represented by server-side data store 132. In one case, the server-side security module 130 can maintain, on behalf of the user device 102, the above-described list(s) of approved and prohibited network-accessible entities. The server-side security module 130 can maintain such lists for other user devices too. Alternatively, and/or in addition, the server-side security module 130 can provide a community-based repository for sharing information among a group of users regarding the behavior of network-accessible entities. Through this mechanism, users can access and rely on approval/denial decisions made by other users and/or general warnings issued by other users.

The following sections provide additional details regarding the features introduced above.

A.2. Exemplary Security-Related Functionality (FIG. 2)

Figure 2:
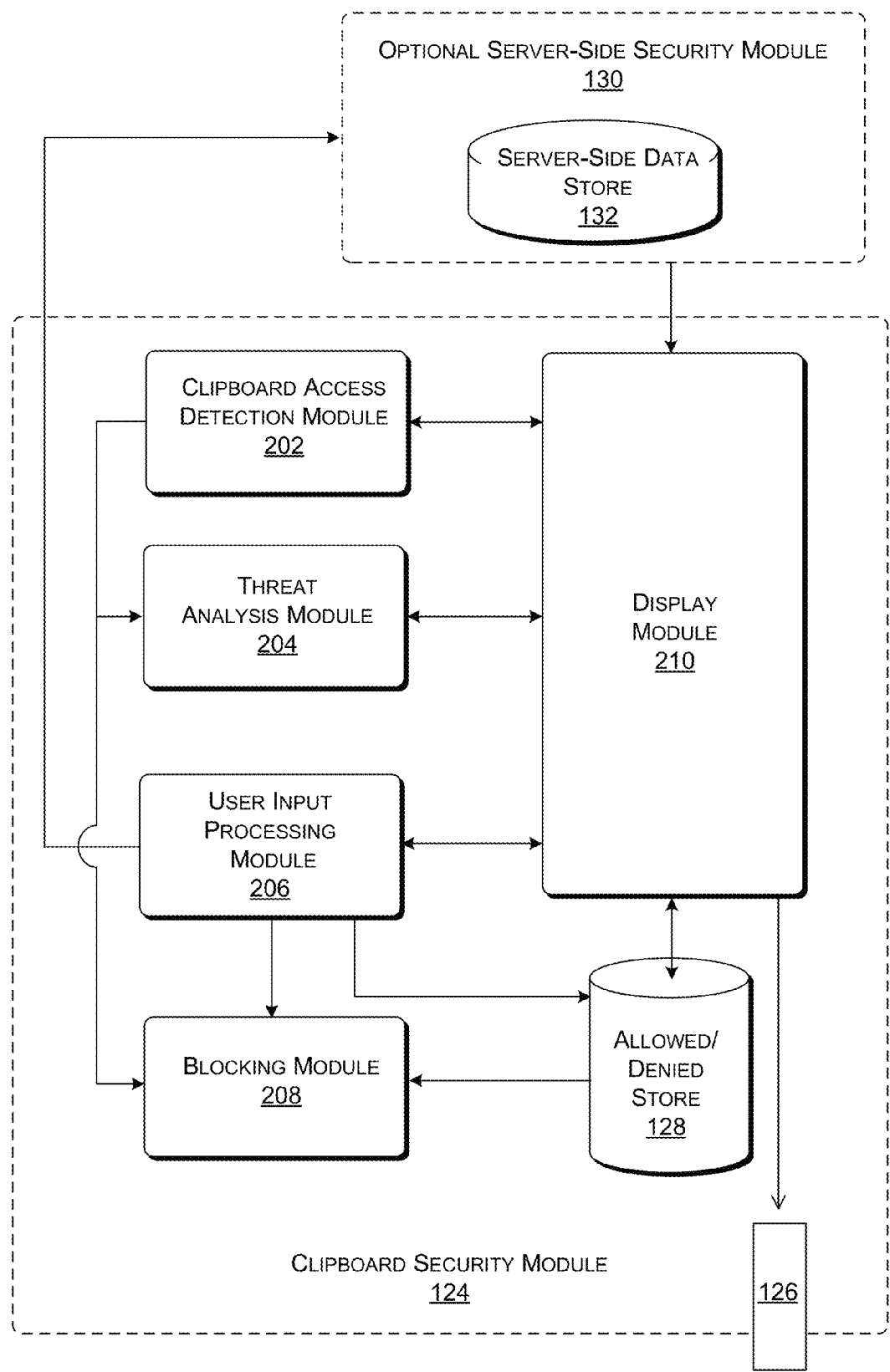
FIG. 2 shows exemplary security functionality for controlling access to the clipboard module for use in the system of FIG. 1.

FIG. 2 shows one exemplary implementation of various components of FIG. 1 that are dedicated to controlling access to the clipboard module. These components include the client-side clipboard security module 124 and the server-side security module 130. While FIG. 2 shows a particular exemplary allocation of modules between the clipboard security module 124 and the server-side security module 130, other implementations can allocate these modules in a different way, e.g., by moving certain modules to the server-side security module 130 from the clipboard security module 124 and/or vice versa.

The clipboard security module 124 includes various component modules. An access detection module 202 detects whether a network-accessible entity is attempting to read information from the clipboard module 122 and/or write information to the clipboard module 122 and/or perform any other action which affects the clipboard module 122. In one case, the access detection module 202 can detect any kind of access. In another case, the access detection module 202 can flag only certain types of access. For instance, in one case, the access detection module 202 can detect when a network-accessible entity is using a script-based program or other type of program to automatically access the clipboard module 122. In general, the access detection module 202 can determine whether an entity is attempting to access the clipboard module 122 based on a request or other instruction that is submitted to the clipboard module 122 by the entity.

The access detection module 202 can extract various information regarded a detected access. For instance, the access detection module 202 can extract an identifier assigned to the entity which is making the access attempt. The identifier may correspond to the network address of the entity that is making the access attempt. The access detection module 202 can also optionally determine the type of request being submitted to the clipboard module 122. In one case, the entity can be attempting to read information from the clipboard module 122. In another case, the entity can be attempting to write information to the clipboard module 122. In another case, the entity can be attempt to exert control over the behavior of the clipboard module 122, such as by attempting to periodically flush the contents of the clipboard module 122.

The clipboard security module 124 can optionally also include a threat analysis module 204. The threat analysis module 204 can characterize the type of threat posed by the access attempt and present a warning message to the user based on its analysis. In one case, the threat analysis module 204 can rely on a set of stored rules which map various types of situations that may be encountered with the types of threats posed by the respective situations. For example, the threat analysis module 204 can determine that an entity poses a threat if it has made a rapid series of requests to read or write information from/to the clipboard module 122. In another case, the threat analysis module 204 can determine that an entity poses a threat if is attempting to write certain types of information to the clipboard module 122. For example, the threat analysis module 204 can identify content that contains machine-readable instructions or other machine-interpretable information as being potentially dangerous. In another case, the threat analysis module 204 can determine that an entity poses a threat if it is attempting to read certain types of sensitive information from the clipboard module 122. For example, the threat analysis module 204 can identify content that appears to contain credit card account information as being potentially sensitive in nature. The threat analysis module 204 can apply yet other rules and provide corresponding warning messages based on the application of these rules.

The clipboard security module 124 can include a user input processing module 206. The purpose of the input processing module 206 is to receive input from the user regarding how to resolve a particular access attempt by a network-accessible entity. For example, the user may use the input processing module 206 to approve or deny a current access attempt, to approve or deny all access attempts by the particular entity making the current request, to clear all or part of the information stored in the clipboard module 122, and so forth.

The clipboard security module 124 can include a local store 128 for storing lists of approved and denied network-accessible entities (which have been identified by the user via the input processing module 206). That is, when the user activates a command prompt for "Approve Always," the user input processing module 206 can add the particular entity in question (which is making the current request) to a list of approved entities. When one of these approved entities again attempts to access the clipboard module 122, this entity will be automatically permitted to do so without troubling the user to expressly approve the access attempt. Nevertheless, the clipboard security module 124 can still optionally present a security presentation 126 to the user when a previously allowed entity is making an access attempt, e.g., to alert the user to the fact that such activity is taking place, and to give the user the option of changing the status of the entity from approved to denied. In contrast, when the user activates a command prompt for "Deny Always," the user input processing module 206 can add the particular entity in question (which is making the current request) to a list of denied entities. When one of these denied entities again attempts to access the clipboard module 122, this entity will be automatically blocked from doing so. Optionally, in this circumstance, the clipboard security module 124 can still display the security presentation 126 to alert the user to an access attempt that is taking place.

A blocking module 208 can accept a user's current or previous approve/deny instructions to either approve or deny access to the clipboard module 122. The blocking module 210 can deny access to the clipboard module 122 by rejecting a request to access the clipboard module 122 and/or by taking some other blocking action(s).

As explained above in section A.1, the server-side security module 130 can also play a role in governing access to the clipboard module 122. In one case, the server-side security module 130 can store the approved/denied lists for the user device 102 (and for many other user devices, not shown), instead of, or in addition to, relying on the user device 102 to store this information. In another case, the server-side security module 130 can allow a user to share his or her approved/denied lists with another user or a group of other users. A user who receives such lists can then rely on these lists to govern access to his or her own clipboard module (not shown). In another case, the server-side security module 130 can supplement or replace the threat analysis that is optionally locally performed by the threat analysis module 204. In another case, the server-side security module 130 can aggregate the approved/denied lists of many users to provide a community-based master list of approved and denied entities. For instance, such a community-based master list could identify entities that have been identified by a significant number of users as posing a serious security threat. The server-side security module 130 can be used in yet other ways.

Finally, the clipboard security module 124 can include a display module 210. The purpose of the display module 210 is to interact with one or more of the above-described modules to generate the security presentation 126. The following section describes the exemplary operation of the display module 210 in greater detail.

Figure 4:
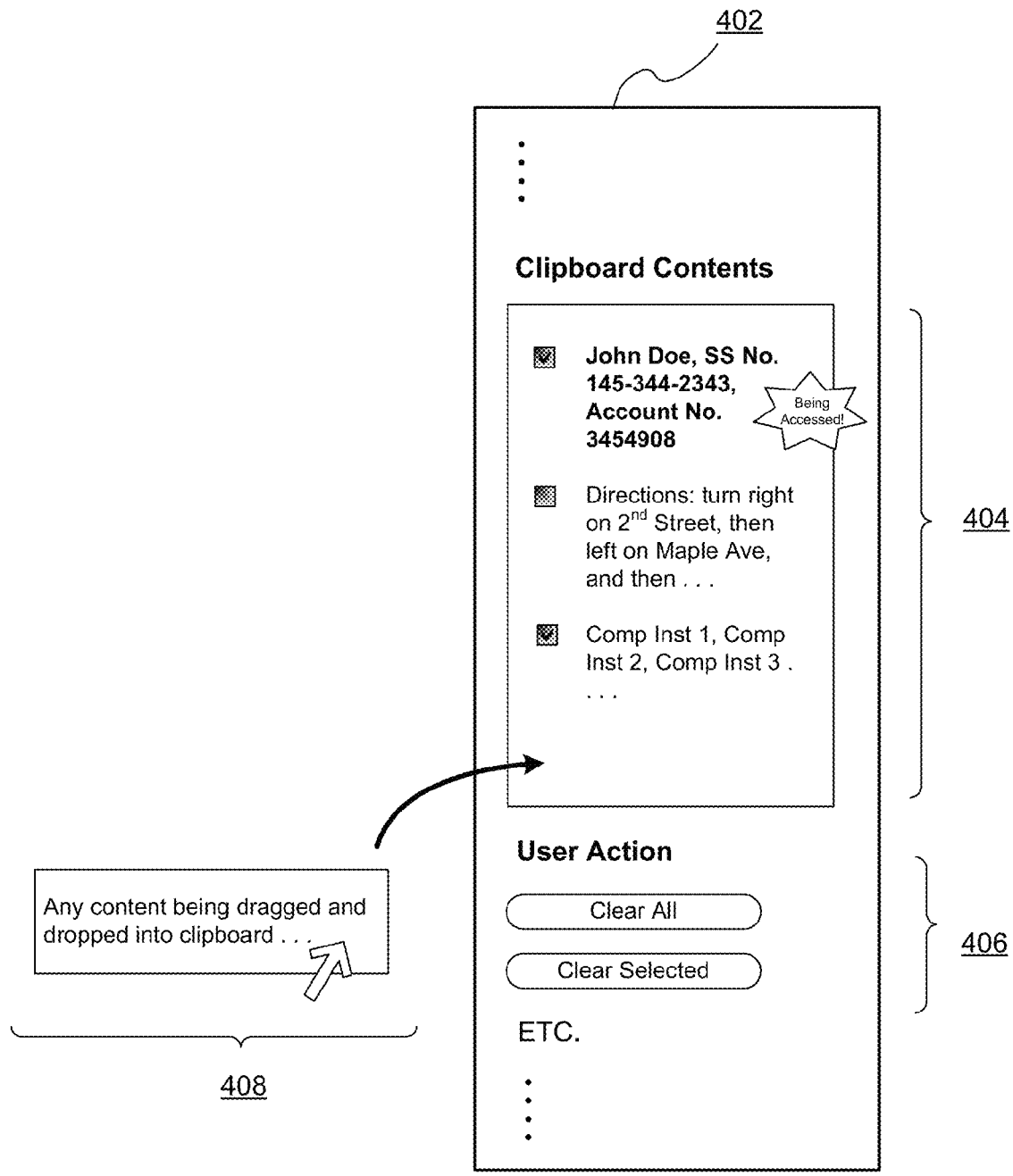
FIG. 4 shows another exemplary implementation of the security presentation.
Figure 5:
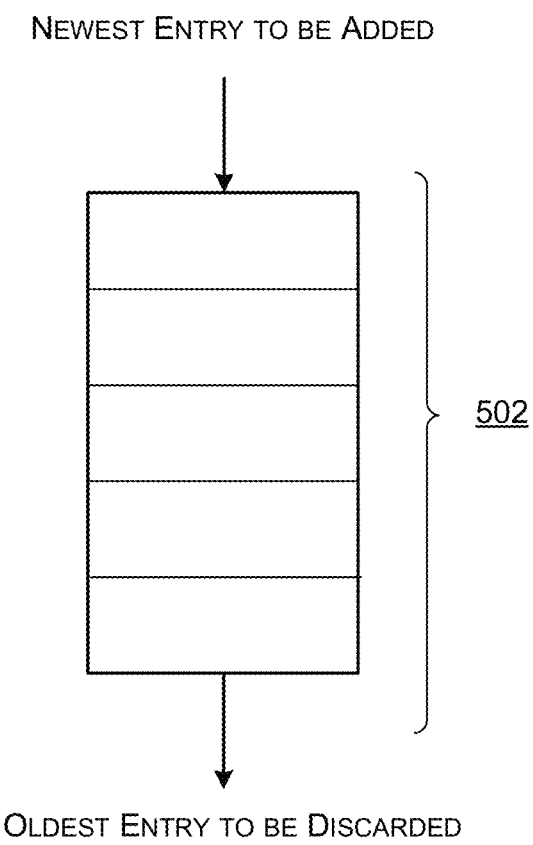
FIG. 5 illustrates an exemplary manner in which the clipboard module can retain and remove entries.

A.3. Exemplary Security Presentations (FIGS. 3-5)

Figure 3:
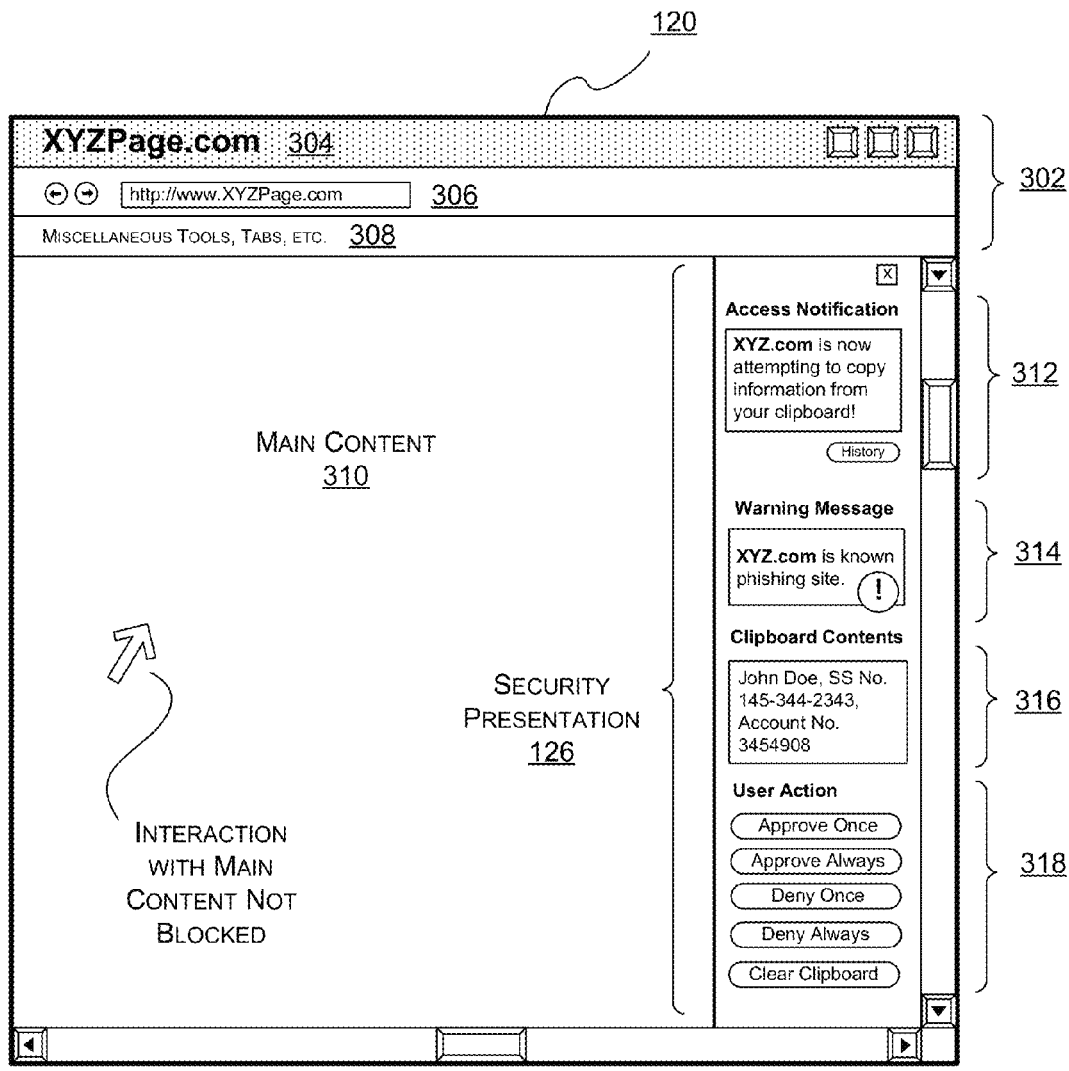
FIG. 3 shows an exemplary user interface presentation that includes one exemplary implementation of the security presentation.

FIG. 3 shows a user interface presentation 120 that can be generated by the browser module 116. This user interface presentation 120 is representative and non-limiting. Other user interface presentations can adopt a different style, selection of parts, arrangement of parts, and so forth, compared to that shown in FIG. 3.

The user interface presentation 120 includes various parts. A header part 302 provides various conventional fields of information presented by many types of browser modules, such as a title bar field 304, a page address field 306, and a field 308 that provides an assortment of tools, tabs, and so forth. (More generally, tools, tabs, etc. can be distributed throughout the header part 302 in various ways, e.g., in various bars, not specifically shown.)

The page address field 306 can identify a network address of a page with which the user is currently interacting. A main content part 310 shows the contents of the page corresponding to the identified network address. The main content part 310 can include any combination of text, images, animated content, user controls, and so on.

The user interface presentation 120 also includes the security presentation 126. In this particular case, the clipboard security module 124 (more particularly, the display module 210) displays the security presentation 126 as a sidebar to the right of the main content part 310. This is one of many possible implementations. In other cases, the clipboard security module 124 can display the security presentation 126 to the left, top, and/or bottom with respect to the main content part 310, or at some point within the main content part 310. In another case, the clipboard security module 124 can display the security presentation 126 as a semi-transparent presentation on top of the main content part 310; this allows the user to see information being imparted by both the security presentation 126 and the underlying main content part 310. In another case, the clipboard security module 124 can display the security presentation 126 on one presentation module and the main content on another, distinct, presentation module. Still other implementations are possible.

In one case, the clipboard security module 124 can present the security presentation 126 when an access attempt is detected. The clipboard security module 124 can then remove the security presentation 126 when the access attempt has been approved or denied. In one case, the clipboard security module 124 can automatically display the security presentation 126 when the attempt is detected, e.g., without querying the user whether the user wants such a display. In another case, the clipboard security module 124 can expressly prompt the user whether they want the security presentation 126 to be displayed. In another case, the clipboard security module 124 can allow the user to activate the security presentation 126 at any time, e.g., even though there is no access attempt currently being made.

In one case, the clipboard security module 124 can remove the security presentation 126 when the user enters a command via the security presentation 126. For example, the clipboard security module 124 can remove the security presentation 126 when the user enters any kind of approve/deny instruction and/or any kind of clipboard flushing instruction. Or the clipboard security module 124 can remove the security presentation 126 when the user enters an express command to remove this presentation, even though the user may not have made a decision regarding whether to approve or deny an attempted access.

In another case, the clipboard security module 124 can automatically remove the security presentation 126 after a predetermined time, such as, without limitation, 30 seconds. In one implementation, the clipboard security module 124 can remove the presentation by fading it out, that is, by gradually making it more transparent with respect to the underlying main content part 310. The clipboard security module 124 may automatically remove the security presentation 126 in those cases in which the user does not need to make a decision with respect to an access attempt. For instance, the clipboard security module 124 can display the security presentation 126 to alert the user to the fact that an entity having the status of "deny always" has made an attempt to access the clipboard module 122. Since the clipboard security module 124 will automatically block this access attempt, the user need not input any express instructions with respect to the current access. In this scenario, the clipboard security module 124 can remove the security presentation after a predetermined period of time.

In another case, an access attempt may not be approved or denied in advance. Even in this case, the clipboard security module 124 can automatically remove the security presentation 126 after a predetermined period of inaction by the user, that is, without receiving an approve/deny instruction from the user. The clipboard security module 124 can rely on various default rules to determine the status of the access attempt in such a case. In one case, the clipboard security module 124 can automatically deny an access attempt if the user does not make a decision. In another case, the clipboard security module 124 can automatically approve an access attempt if the user does not make a decision. The user may optionally be allowed to configure the clipboard security module 124 to apply a desired default rule in the event of user inaction.

In one case, the browser module 116 can clear the contents of the clipboard module 122 when the browser is closed.

As described above, the security presentation 126 can include various fields. FIG. 3 shows an exemplary assortment of fields (312-318). The style of the fields, arrangement of the fields, selection of the fields, and so forth is representative; other implementations can adopt other configurations.

Access Notification Field. The security presentation 126 can display a message 312 which alerts the user that there has been an attempt to access the clipboard module 122. This message 312 can identify the network-accessible entity which is making the attempt. This message 312 can also identify the action that the entity is attempting to perform. The access detection module 202 of FIG. 2 can furnish the information that is used to populate this field.

In the example of FIG. 3, the message 312 indicates that a network-accessible entity identified as "XYZ.com" is attempting to read information from the clipboard module 122. The entity identified in message 312 may correspond to the same entity identified in the header 306 of the user interface presentation 120, meaning that the same entity that the user is interacting with in the main content part 310 is attempting to gain access to the clipboard module 122. But this is not necessarily the case. In the scenario shown in FIG. 3, the user is interacting with entity "XYZPage.com" in the main content part 310, yet the entity that is attempting to gain access to the clipboard module 122 is "XYZ.com." The entity making the access attempt ("XYZ.com") may represent a previously activated page which is still active. For instance, the XYZ.com entity may correspond to a page that the user has tagged, but the user currently does not have focus on this page.

Although not shown, the security presentation 126 (or some other presentation that can be activated by the user) can display any information regarding past attempts by one or more entities to access the clipboard module 122. This type of display can provide the user with additional context in deciding whether a current access attempt poses a threat or not. This display can take the form of a list of prior access attempts, with a series of columns identifying attributes of the attempts (such as entities making the attempts, the types of actions that the entities attempted to perform, the types of information targeted by the attempts, how the attempts were resolved, and so on). In the exemplary case of FIG. 3, the user may activate such a historical listing by actuating a "History" command prompt in message field 312.

Warning Message Field. The security presentation 126 can optionally display a warning message 314. The warning message can characterize the type of the threat posed by the access attempt. The threat analysis module 204 of FIG. 2 can furnish the information that is used to populate this field.

Clipboard Contents Field. The security presentation 126 can display a message 316 that conveys the nature of the information that the network-accessible entity is attempting to read from the clipboard module 122 or write to the clipboard module 122. The access detection module 202 of FIG. 2 can furnish the information that is used to populate the message 316. In the exemplary scenario shown in FIG. 3, the information stored in the clipboard module 122 corresponds to sensitive user information, such as the user's social security number and bank account number. This is an example of the type of information that the user typically would not want released to unauthorized parties.

Action Invitation Field. The security presentation 126 can display various command prompts in message field 318. These command prompts invite the user to take action with respect to the attempted access. One such command prompt invites the user to approve the current access attempt. Another command prompt invites the user to deny the current access attempt. Another command prompt invites the user to approve all access attempts by the particular network-accessible entity that is making the current access attempt. Another command prompt invites the user to deny all access attempts by the particular network-accessible entity making the current access attempt. Another command prompt invites the user to clear the information that is stored in the clipboard module 122. Still further command prompts can be provided to the user. The user can select any one or more of these command prompts to take action with respect to the attempted access.

As described above, the clipboard security module 124 can provide the security presentation 126 in such a manner that this presentation 126 is non-blocking with respect to the main content part 310. This means that the browser module 116 allows the user to continue to interact with the main content part 310 while the clipboard security module 124 is waiting for the user to make a decision (e.g., whether to approve or deny access), if, in fact, a particular instance of the security presentation 126 requires input from the user. This is in contrast to a type of display that freezes interaction with the main content part 310 until the user makes a decision regarding how to proceed.

In a variation of the above technique, the browser module 116 can provide multiple tabs. The browser module 116, under the direction of the user, can assign different network-accessible entities 106 (or different pages provided by a single network-accessible entity) to different tabs, and allow the user to interact with a particular entity or page by activating its associated tab. Activating a tab changes the focus of the user interface presentation 120. The clipboard module 122 can be shared among the various tabbed pages. In this scenario, assume that an entity attempts to access the clipboard module 122 while the user is interacting with a particular tabbed entity. The clipboard security module 124 can effectively freeze the user's interaction with the tabbed entity, yet allow the user to freely interact with other tabbed entities.

The clipboard module 122 can store information in different ways. In one case, the clipboard module 122 can store only the most recent entry added to the clipboard module 122. This scenario may correspond to the case of FIG. 3, in which the clipboard module 122 stores a single entry, as identified in message field 316. In this case, the user can operate the command prompts in field 318 to approve or deny access with respect to the single entry, and/or to clear the clipboard module with respect to the single entry.

In another case, the clipboard module 122 can store plural entries. Accordingly, the clipboard security module 124 can operate on the clipboard module 122 in a more selective manner. Consider the scenario shown in FIG. 4, which illustrates part of another security presentation 402. In this case, the clipboard module 122 stores at least three different entries. These entries may have been copied into the clipboard module 122 at different respective times. The security presentation 402 includes a message field 404 which itemizes the three entries in the clipboard module 122. The clipboard security module 124 can identify the entry (or plural entries) that are specifically being targeted by an access attempt, such as by highlighting the targeted entry or entries. In one case, an access attempt may be specifically directed to a particular entry, such as the most recently added entry. In other cases, the access attempt may include a general request to read from (or write to) the entire clipboard module 122.

As indicated in message field 406, the security presentation 402 can give the user the option of taking action with respect to only certain entries stored in the clipboard module 122. For example, the message field 404 includes illustrative checkboxes next to each entry that is stored in the clipboard module 122 (although other means of demarcating entries can be used). The user can check which entries will be affected by the command prompts provided in message field 406. In the exemplary case of FIG. 4, the message field 406 gives the user the option of clearing the entire contents of the clipboard module 122 or only clearing certain entries (which are checked). Although not shown, the message field 406 can also include command prompts which allow the user to make approve/deny decisions with respect to individual entries.

FIG. 4 also illustrates one exemplary way that a user may add a new entry to the clipboard module 122. In this technique, the user can drag and drop entry 408 into the message field 404 of the security presentation 402. For example, the user may be interacting with a web page or local application. The user can move an entry from such a source into the clipboard module 122 using the drag and drop technique described above. Other techniques can be used to transfer entries into the clipboard module 122. Similar techniques can be used to selectively remove entries from the clipboard module 122 (such as by dragging and dropping an entry from the message field 404 into a trash bin UI field (not shown) of the user interface presentation.

FIG. 5 illustrates one way in which the clipboard module 122 can store and discard entries. As indicated there, the clipboard module 122 can accommodate a predetermined number of entries 502. The clipboard module 122 can fill this storage space on a first-in-first-out (FIFO) basis. Once full, the storage of a new entry in the clipboard module 122 will cause the removal of the oldest (i.e., least recently added) entry in the clipboard module 122. Other ways of managing the contents of the clipboard module 122 can be used. For example, the clipboard module 122 can automatically remove entries that have been stored in the clipboard module 122 for more than a prescribed period of time.

A.4. Exemplary Processing Functionality (FIG. 6)

Figure 6:
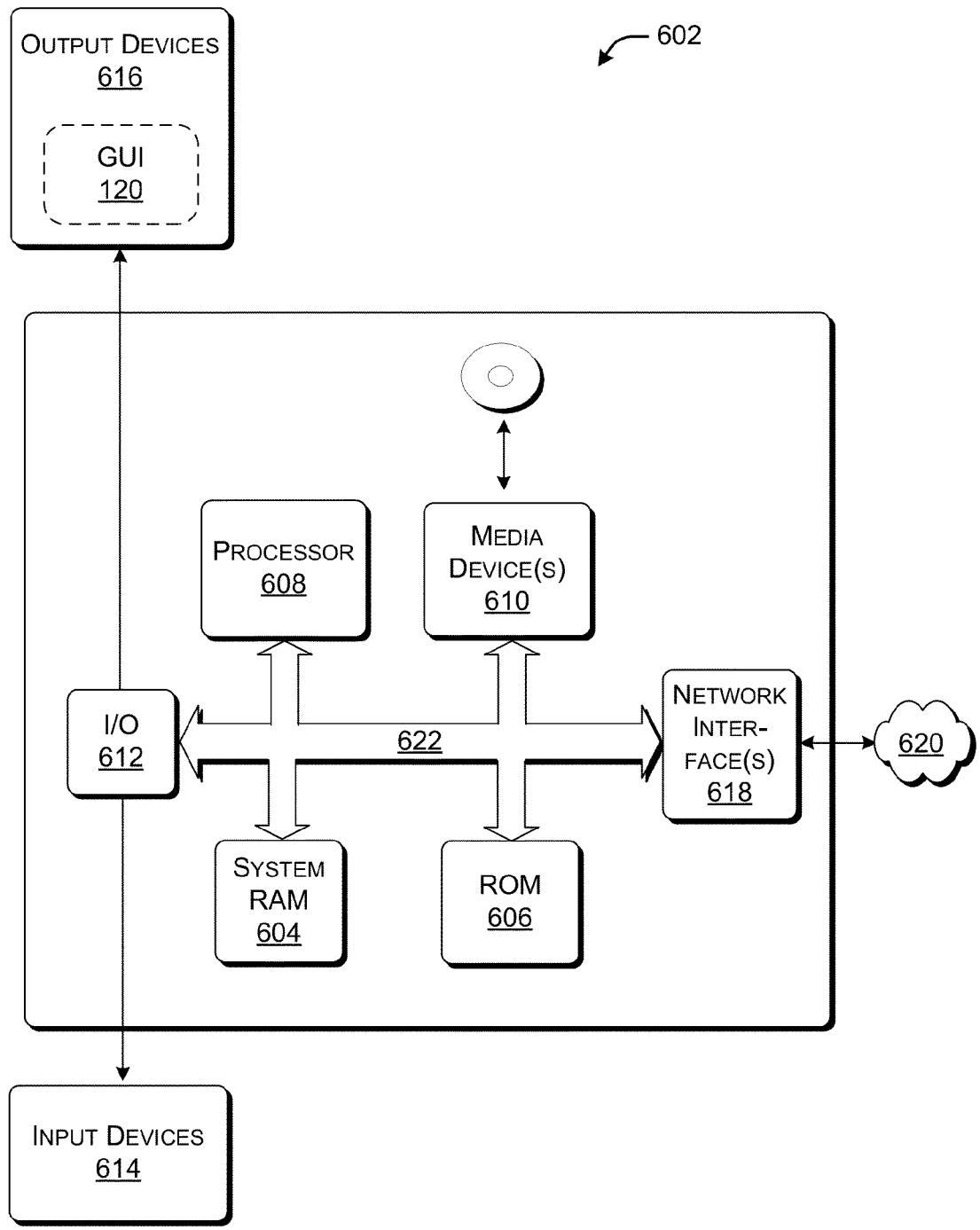
FIG. 6 shows exemplary processing functionality that can be used to implement any aspect of the system of FIG. 1.

FIG. 6 sets forth exemplary processing functionality 602 that can be used to implement any aspect of system 100 shown in FIG. 1. In one non-limiting case, for instance, the processing functionality 602 may represent any computer machine used by the system 100, e.g., to implement any aspect of the user device 102, any aspect of the sever-side security module 130, any aspect of any network-accessible entity, and so on.

The processing functionality 602 can include various volatile and non-volatile memory, such as RAM 604 and ROM 606, as well as one or more central processing units (CPUs) 608. The processing functionality 602 can perform various operations identified above when the CPU 608 executes instructions that are maintained by memory (e.g., 604, 306, or elsewhere). The processing functionality 602 also optionally includes various media devices 610, such as a hard disk module, an optical disk module, and so forth.

The processing functionality 602 also includes an input/output module 612 for receiving various inputs from the user (via input devices 614), and for providing various outputs to the user (via output devices 616). One particular output device may include the presentation module 118 and an associated graphical user interface (GUI) 120 introduced in the context of FIG. 1. The processing functionality 602 can also include one or more network interfaces 618 for exchanging data with other devices via one or more communication conduits 620, such as the network 114 introduced in the context of FIG. 1. One or more communication buses 622 communicatively couple the above-described components together.

B. Exemplary Procedures

Figure 7:
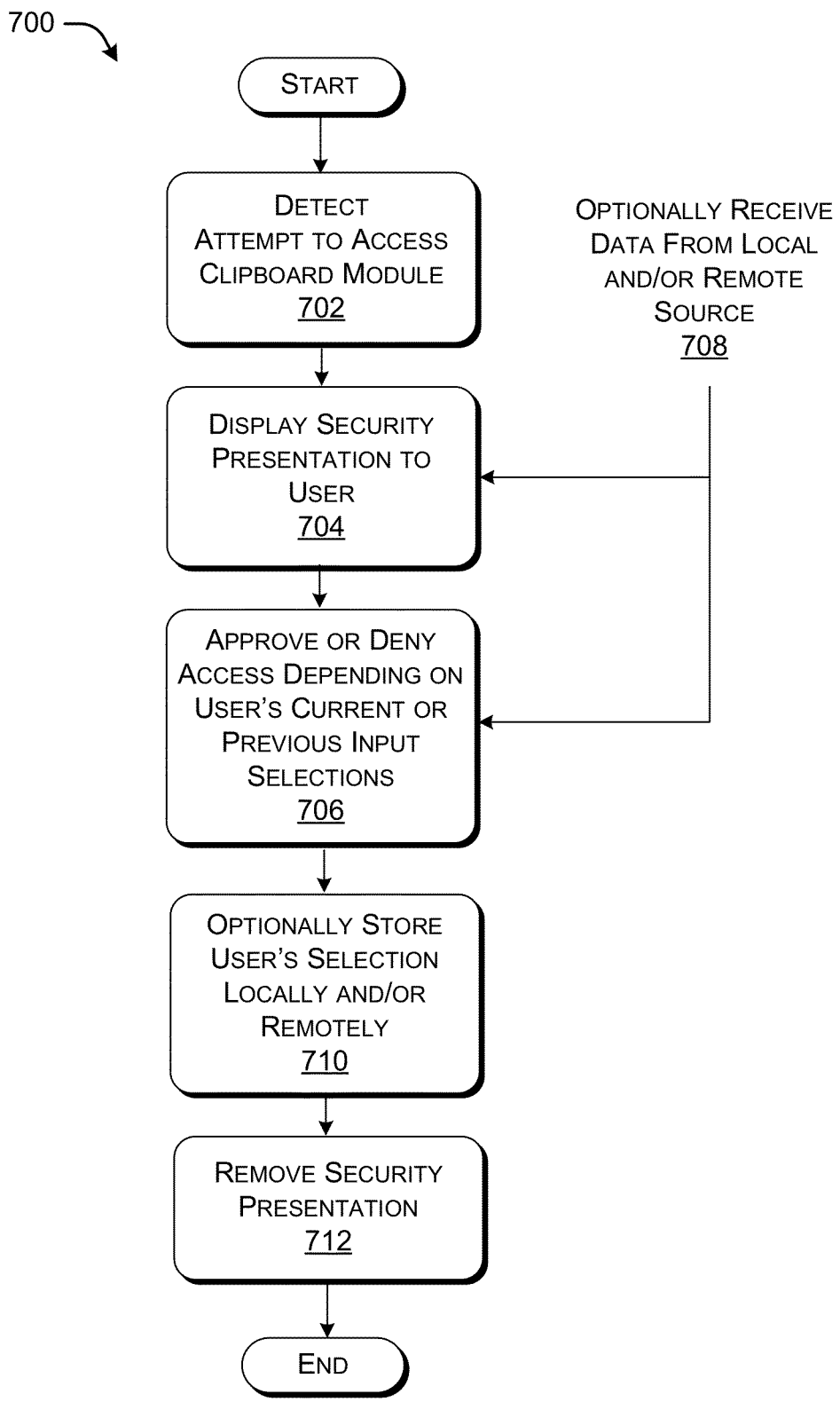
FIG. 7 shows an exemplary procedure which explains one manner of operation of the system of FIG. 1.

FIG. 7 shows a procedure 700 which explains the operation of the system 100 in flow chart form. To facilitate discussion, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As the functions described in the flowchart have already been set forth in Section A, Section B serves principally as a review of those functions.

In operation 702, the clipboard security module 124 detects an attempt to access the clipboard module 122, e.g., either to read information from the clipboard module 122, write information to the clipboard module 122, and/or perform any other action that affects the clipboard module 122. The clipboard security module 124 performs this detection for the main purpose of flagging security threats posed by untrusted entities. In one alternative case, an application designer may monitor accesses being made to the clipboard module 122 to ensure that his or her design is operating properly.

In operation 704, the clipboard security module 124 can display the security presentation 126 in response to the detected access. The security presentation 126 can include one or more of the fields described above.

In operation 706, the clipboard security module 124 either approves or denies the attempted access. This operation 706 may rely on the express selections made by the user to approve or deny the particular access attempt in question, e.g., in response to the user activating an "Approve" or "Deny" type of command prompt. Or this operation 706 may rely on a previous instruction from the user to always approve or always deny access to the entity that is making the current access attempt.

Operation 708 indicates that operations 704 and 706 can alternatively, or in addition, rely on data obtained from a remote source, such as the server-side security module 130. For instance, as to operation 704, the clipboard security module 124 can rely at least in part on data obtained from the server-side security module 130 to present security warnings to the user. As to operation 706, the clipboard security module 124 can rely at least in part on "Approve Always" and "Deny Always" lists stored in the server-side security module 130.

In operation 710, the clipboard security module 124 can update an "Approve Always" list and/or a "Deny Always" list if the user makes such a selection in operation 706. These lists can be maintained locally (at the user device 102) or remotely (at the sever-side security module 130).

In operation 712, the clipboard security module 124 can remove the security presentation 126 after the user makes an express selection, and/or after a predetermined period of time has elapsed (regardless of whether the user makes a selection), and/or in response to some other factor or factors.

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by a client device for controlling access to a resource maintained in a data store of the client device that is accessible to network entities, comprising:
    interacting with web content associated with a network entity via a web-enabled application of the client device;
    detecting at the client device an attempt by the web content to access the resource maintained in the data store of the client device, the data store associated with a security module that facilitates transfer of content between applications of the client device;
    determining an access setting associated with the network entity; and
    controlling access of the web content to the resource according to the access setting that is determined for the network entity.

2. The method of claim 1, wherein the client device corresponds to a trusted environment that includes one or more applications trusted to access the resource and the web content corresponds to an untrusted environment for which access to the resource is restricted.

3. The method of claim 2, wherein the untrusted environment comprises a plurality of entities accessible over a network.

4. The method of claim 1, wherein the web-enabled application is a browser.

5. The method of claim 1, wherein the web content comprises web pages.

6. The method of claim 1, wherein the web content comprises media content.

7. The method of claim 1, further comprising presenting a notification to alert a user regarding the attempt to access the resource.

8. The method of claim 7, wherein the notification includes one or more of an indication regarding an identity of the network entity, a description of the resource, or an indication regarding an action attempted by the web content with respect to the resource.

9. The method of claim 1, wherein the data store is associated with a clipboard module that facilitates copying and pasting of content between applications of the client device.

10. The method of claim 1, wherein determining the access setting associated with the network entity comprises referencing a list of approved and prohibited network-accessible entities to ascertain actions the network entity is allowed to take with respect to the resource.

11. The method of claim 1, wherein controlling access of the web content to the resource comprises enabling the web content to perform one or more actions with respect to the resource when the access setting indicates the one or more actions are allowed.

12. The method of claim 1, wherein controlling access of the web content to the resource comprises preventing performance of actions with respect to the resource that are disallowed according to the access setting.

13. A client device, comprising:
    one or more processors; and
    memory including a data store that is accessible to network entities and associated with a security module that facilitates transfer of content between applications of the client device; and computer-executable instructions stored in the memory that, when executed by the one or more processors, cause the client device to implement the security module to perform operations to control access to a resource maintained in the data store, including:
- detecting an attempt to access the resource by a network entity with which the client device is interacting through a network-enabled application;
- determining an access setting associated with the network entity;
- enabling the network entity to perform one or more actions with respect to the resource that are allowed according to the access setting; and
- preventing performance by the network entity of actions with respect to the resource that are disallowed according to the access setting.

14. The client device of claim 13, wherein determining the access setting associated with the network entity comprises:
- responsive to detecting the attempt, displaying a security presentation in a user interface for the network-enabled application having a notification regarding the attempt and a prompt for a user selection to approve or deny the attempt; and
- obtaining a user selection indicative of the access setting through the security presentation.

15. The client device of claim 14, wherein the a security presentation is displayed along with main content that is presented via the network-enabled application in a manner that is non-blocking with respect to the main content.

16. The client device of claim 13, wherein determining the access setting associated with the network entity comprises referencing a list of approved and prohibited network-accessible entities to ascertain actions the network entity is allowed to take with respect to the resource.

17. The client device of claim 13, wherein the computer-executable instruction, when executed by the one or more processors, further cause the client device to perform operations to including allowing access to the resource for one or more applications of the client device associated with a trusted environment.

18. One or more computer readable memory devices storing instructions that, when executed by one or more components of a client device, implement a security module for the client device configured to perform operations to control access to a resource maintained in a data store of the client device that is accessible to network entities, including:
- enabling entities associated with a trusted environment defined by the security module to access the resource;
- detecting an attempt by a web page associated with a network entity to access the resource from the data store, the web page associated with an untrusted environment defined by the security module and the data store implemented in memory of the client device associated with the security module employed to control transfer of content between the trusted environment and the untrusted environment; and
- controlling access of the web page to the resource according to an access setting associated with the network entity including enabling the web page to perform one or more actions with respect to the resource that are allowed according to the access setting and preventing performance by the web page of actions with respect to the resource that are disallowed according to the access setting.

19. One or more computer readable memory devices of claim 18, wherein the web page is accessed over a network by an application executed at the client device.

20. One or more computer readable memory devices of claim 19, wherein the application comprises a browser module.

* * * * *